July 4, 1950          K. R. HERMAN          2,513,486
POWER CONTROL VALVE
Filed Feb. 15, 1946
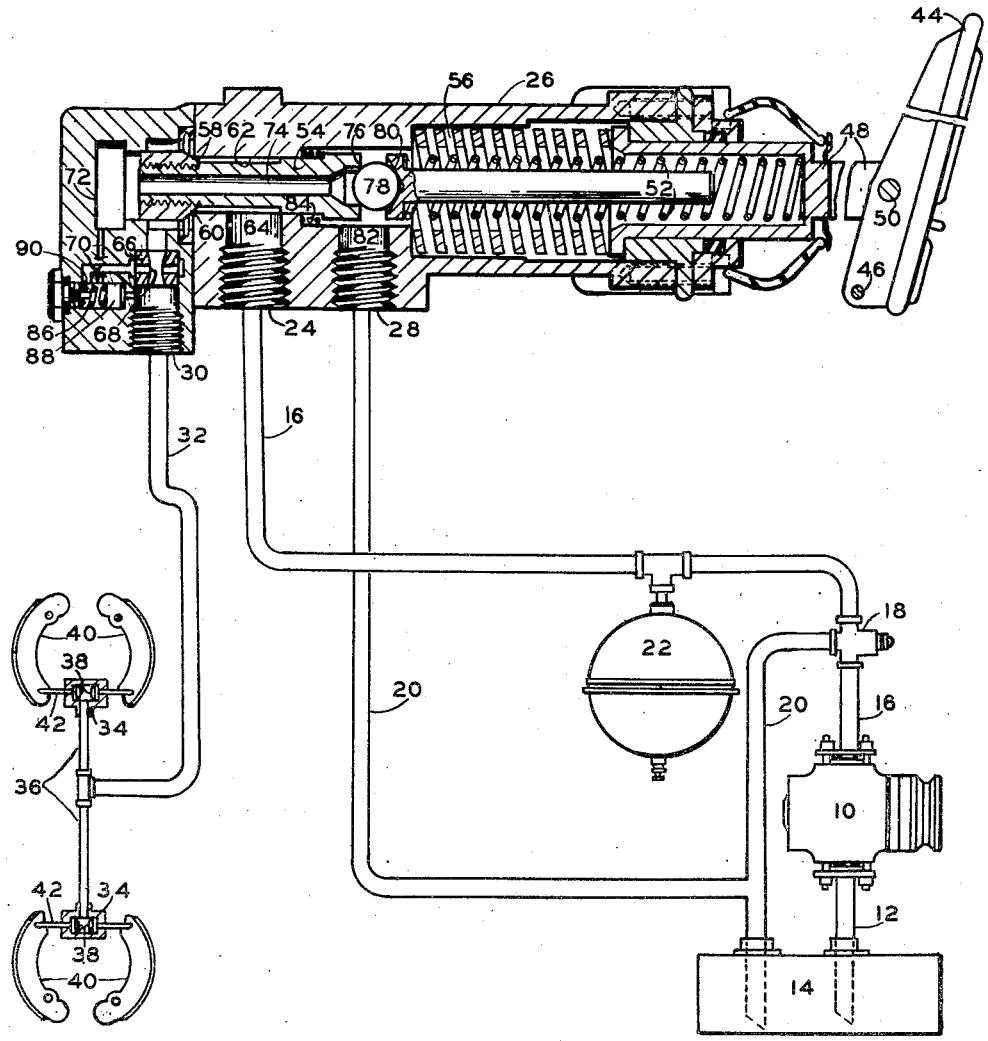
*INVENTOR.*
KENNETH R. HERMAN
BY
*Ralph L. Tweedale*
ATTORNEY Patented July 4, 1950

2,513,486

UNITED STATES PATENT OFFICE 2,513,486

POWER CONTROL VALVE

Kenneth R. Herman, Franklin, Mich., assignor to Vickers Incorporated, Detroit, Mich., a corporation of Michigan Application February 15, 1946, Serial No. 647,839

5 Claims. (Cl. 303—54)

This invention relates to power transmissions, particularly to those of the type comprising two or more fluid pressure energy translating devices, one of which may function as a pump and another as a fluid motor.

The invention is more particularly concerned with power transmission systems adapted for use in applying selectively variable force to a load device such as a vehicle or aircraft brake.

In operation of such a load, it is desirable that the force applied to the load be under operator control in such a manner that the manual effort applied to the controlling element determines the force applied to the load as distinguished from a condition where the distance through which the controlling element is moved determines such force. In other words, it is desirable that the control has the same "feel" as occurs in a system where the manual effort is transmitted directly to the load without amplification from an outside source.

Systems heretofore proposed for providing such control have been limited in the degree to which the load at the brake sets up a reactive force opposing the brake pedal force. The element of time between the operation of the brake, and the production of a reactive stabilizing force for feel load opposing the manual force on the brake pedal is paramount to smooth efficient operation of any brakeage system.

One of the objects of this invention is to provide a brake system wherein the brake load and feel load, for reactive force on the brake pedal, are produced simultaneously or within narrow limits of time heretofore considered impractical.

A further object of this invention is to provide an equalizing valve adapted to delay the production of the reactive force on the valve, and opposing the brake pedal until the hydraulic fluid at the brake has reached its operating pressure limit. More specifically, one of the objects of this invention is to produce stabilizing means in the equalizing valves, whereby, no reactive pressure is produced to oppose the brake pedal force until the columns of hydraulic operating fluid between the valve and the brake has stopped flowing, and reached a static condition. In other words, the invention provides a valve capable of producing a local pressure reaction simultaneously with the pressure load at the brake.

Further objects and advantages of the present invention will be apparent from the following description, reference being had to the accompanying drawing wherein a preferred form of the present invention is clearly shown.

In the drawing the single figure is a longitudinal section of the equalizing valve, and a brake circuit schematically illustrated connected thereto.

Referring now to the drawing, a pump 10 may be driven by any suitable prime mover not shown, and has a suction conduit 12 through which fluid may be withdrawn from a tank 14, and discharged to a delivery or pressure conduit 16. Incorporated in the conduit 16 is an unloading valve 18 of any suitable construction for diverting the pump delivery back to tank 14 through conduit 20 whenever a pre-determined pressure exists in accumulator 22 connected in the pressure conduit 16.

The pressure supply conduit 16 is connected to the pressure port 24 of the equalizing valve 26. The equalizing valve 26 is also provided with tank port 28 connected to tank 14 through exhaust conduit 20, and with a brake operating port 30 connected by operating line 32 to brake cylinder 34. Two equivalent brakes or load devices are shown connected by the branch line 36 of conduit 32, although several may be required in a complete system. Each load device comprises piston 38 connected to brake shoes 40 by rod 42. To operate the brakes or load devices, the brake pedal 44 is depressed, whereby, the equalizing valve 26 ports fluid from the pressure supply port 24 to the motor or brake operating port 30 and line 32.

The details of the equalizing valve 26 are shown in the drawing, wherein, brake pedal 44 is pivoted at 46 to the frame, and is pinned to the plunger 48 at point 50. A spring 52 forms a resilient link between the plunger 48 and the valve spool 54. A spring 56 is disposed between the valve body and the plunger for returning the plunger and the brake pedal 44 to their normal position when the manual load is removed therefrom. The flow of hydraulic fluid from the pressure source is controlled by valve 58 of plunger 54 resting on seat 60, thereby, cutting off groove 62 which communicates with passage 64, and pressure port 24 from the operating or motor port 30. When the valve 58 is opened, fluid under pressure is admitted to the venturi 66, and flows then to the motor port 30, the operating lines 32 and 36, and load devices or brakes. The Venturi throat 68 is connected by a passage 70 to the adjacent or integral stabilizing chamber 72, which in turn communicates with the end of the valve spool 54.

The spool valve 54 is provided with an axial passage 74 extending longitudinally through the valve. One end of the passage 74 communicates with the stabilizing chamber 72, and the other end communicates with the ball valve seat 76. A ball valve 78 is held against the seat 76 by means of the spring 52 and the cap 80. When the ball valve 78 is removed from the seat 76 by pressure, the axial passage 74 in the spool valve 54 will communicate through the passage 82 with the exhaust port 28. When the pressure in stabilizing chamber 72 is relieved, and the manual force on brake pedal 44 is removed, spring 84 urges valve spool 54 to the right.

As illustrated, the bore 86 forms a part of the passage 70 extending from the Venturi throat 68 to the stabilizing chamber 72. One end of the bore 86 communicates with the motor line 32. The valve 88 is operated by hydraulic pressures in line 32 or 70 in conjunction with spring 90.

When pressure fluid is admitted to line 32, it operates to close the valve 88 thereby imposing a restriction in the Venturi line 70. So long as the fluid flow through venturi 66 is significant a negative or lower pressure is produced in line 70 tending to hold the valve 88 closed. However, when the liquid column in conduit 32 becomes static or substantially so the pressure in passage 70 will equal that in the motor line 32 and valve 88 will be hydraulically balanced. When that condition exists, the spring 90 will shift the valve 88 to its open position thereby providing uninterrupted communication between the venturi or motor line 32 and the stabilizing chamber 72.

In operation, the equalizing valve functions as follows. When force is applied to the brake pedal 44, the plunger 48, in the drawing, is moved to the left, thereby compressing the spring 52 and exerting a force against the ball 78 and the spool 54, tending to shift the said spool to the left. Shifting of the spool 54 to the left will move the valve 58 from its seat 60, thereby permitting fluid from the pressure port 24, passage 64, and groove 62 to pass over the seat 60, and enter the venturi 66. The hydraulic fluid under pressure continues to flow through the venturi 66, the motor port 30, and the conduits 32 and 36, to the brake or load device. The flow of hydraulic fluid through the venturi 66 will continue until the motor line and brake cylinder 34 are completely filled with fluid.

During the interval the brake cylinders are being filled, a flow of hydraulic pressure fluid is passing through venturi 66. As long as that flow is significant, the pressure on the end of spool 88 communicating with motor line 32 will be greater than the pressure on the other end communicating with bore 86 which is connected through passage 70 to Venturi throat 68. Thus the valve 88 will be closed thereby imposing a restriction in conduit 70 leading to stabilizing chamber 72.

As soon as brake cylinders 34 are filled and the fluid column in conduit 32 becomes static, the pressures in conduit 70 will increase and pressure balance the spool valve 88. The spring 90 will then shift the spool 88 and open the passage 70 for admitting operating pressure to the stabilizing chamber 72. The operating pressure in chamber 72 acts against the end of valve 54 and produces a reactive force or feel load opposing the manual force on the brake pedal 44.

For the purpose of illustrating the basic principle of this invention, suppose the venturi 66 was merely a straight bore passage and further that the spool valve 88 was removed from the passage 70. In that case the hydraulic operating pressure would reach the stabilizing chamber 72 before it would reach the load device or brake cylinders 34 due to its long travel through the conduit 32. Consequently, the pressure in stabilizing chamber 72 would force the spool valve 54 to the right, closing the valve 58 before the operating pressure is reached at the load device or brake. To compensate for the delay due to the long flow through the conduits 32 and 36 to the brake cylinders 34, a venturi 66 is provided in the line. The object of said venturi 66 is to provide means for delaying the pressure rise in stabilizing chamber 72, whereby the required operating pressure in the brake cylinders 34 will be reached at the same time an equal operating pressure is obtained in the stabilizing cylinder 72 for actuating the spool valve 54 and producing a reactive force on the brake pedal 44.

Spool valve 88 in line 70 will delay the rise of fluid pressure in chamber 72, and at the same time will provide a more sensitive control of that pressure rise. Whereas the venturi reaction to flow will vary in proportion to the rate, however when the spool valve 88 is provided, even the slightest difference in pressure between lines 32 and 70 that will overcome the reaction of spring 90, will positively prevent operating pressure from entering chamber 72. Therefore, by adding spool valve 88 to the Venturi circuit, an improvement in the control of the reactive force or feel load on the brake pedal is obtained.

Summarily, the operation can be explained as follows. Any force on the brake pedal 44 will shift the valve 54, thereby connecting the pressure line 16 to the operating or motor line 32. As the pressure fluid flows through the venturi 66 to the brake line 32 and brake cylinders 34, the hydraulic pressure at the brakes will continue to build up so long as the valve 58 is off its seat 60. During the period the remote load devices or brake cylinders 34 are being filled, the fluid flow through the venturi will reduce the pressure in passage 70 and bore 86 below the pressure in the motor line 32. Consequently, the spool valve 88 will be shifted to close passage 70 and delay the admission of operating pressure to the adjacent stabilizing chamber 72 until the hydraulic column in conduit 32 becomes substantially static. When the static condition is reached, the spool valve 88 is pressure balanced and spring 90 shifts the valve 88 to its normally open position, thereby admitting operating pressure to the stabilizing chamber 72.

The pressure in the stabilizing chamber 72 will tend to close the valve 58, and thus a balance will be reached between the operating pressure and the manual force on the brake pedal 44. When the force on the brake pedal 44 is removed, the operating pressure in the adjacent stabilizing chamber 72 against the end of spool 54 will tend to close the valve 58 as aided by the spring 84. If the force on the brake pedal 44 is further reduced, the hydraulic pressure in stabilizing chamber 72 will force the ball valve 78 off its seat 76, thus relieving the stabilizing chamber and load devices, and connecting the operating line to tank through port 28.

It will thus be seen that the present invention has provided a valve particularly suitable for systems involving long or small diameter conduits in which the reactive force developed at the valve is delayed until the operating force has built up at the load device. This is accomplished by the use of a venturi to reverse the flow of fluid and by an arrangement permitting the venturi to modify or reduce the valve reaction so long as the flow is significant.

While the form of embodiment of the invention as herein disclosed constitutes a preferred form, it is to be understood that other forms might be adopted, all coming within the scope of the claims which follow.

What is claimed is as follows:

1. A hydraulic power transmission system for applying selectively variable force to a load device such as a brake comprising a source of fluid under pressure, and equalizing valve and body provided with pressure, exhaust and motor ports and including means such as a brake pedal for operating said valve and controlling the flow of hydraulic fluid from a pressure supply line to an operating line and load device, and hydraulic stabilizing means including a stabilizing chamber integral with the equalizing valve body, and in communication with the valve, a venturi in the motor port, a stabilizing conduit connecting the stabilizing chamber to the throat of the venturi, and a valve in the stabilizing conduit closed by the difference in pressure between the motor port and Venturi throat.

2. An equalizing valve comprising a body provided with a pressure port, an exhaust port and a motor port, manual means for shifting said valve and connecting the pressure port to the motor port, a spring for returning the valve to its normal position when the manual load is removed and connecting the motor port to exhaust, and hydraulic stabilizing means including a stabilizing chamber in said valve body in communication with the end of the equalizing valve, a venturi in the motor port, a conduit connecting the stabilizing chamber to the throat of the venturi, and a valve in the conduit connecting the stabilizing chamber to the Venturi throat, closed by the difference in pressure between the operating line and the Venturi throat during the interval hydraulic fluid is flowing through the venturi to the load device and opened by a spring when the pressures become static in the operating conduits.

3. A brake valve including pressure, motor and exhaust ports, manual means for shifting the valve and connecting the pressure port to the motor port, and a hydraulic stabilizing circuit including a venturi in the motor port, a stabilizing pressure chamber in the brake valve, a passage connecting the throat of the venturi to the stabilizing chamber, and a pressure actuated spool valve closed by the pressure differential between the passage and the motor port for closing the passage during the period of significant flow through the venturi.

4. A brake valve including pressure, motor and exhaust ports, manual means for shifting the valve and connecting the pressure port to the motor port, and a hydraulic stabilizing circuit including a venturi in the motor port, a stabilizing pressure chamber in the brake valve, a passage connecting the throat of the venturi to the stabilizing chamber, a pressure actuated spool valve closed by the pressure differential between the passage and the motor port for closing the passage during the period of significant flow through the venturi, and a spring for shifting the spool valve to its normally open position when the pressure differential is cancelled by termination of the flow through the venturi.

5. A manually operated brake valve provided with fluid conduits for porting pressure fluid to a remote load device and to an adjacent stabilizing chamber, means for delaying the flow of pressure fluid to the adjacent stabilizing chamber until full operating pressure has been reached in the remote load device, said means being controlled by the rate of fluid flow to the load device and comprising a venturi in the conduit connected to the remote load device and the conduit to the adjacent stabilizing chamber being connected to the pressure fluid through the Venturi throat, and a pressure operated control valve in the conduit connected to the stabilizing chamber closed by the differential hydraulic pressure between the conduit extending to the remote load device and the conduit connected to the throat of the venturi.

KENNETH R. HERMAN.

REFERENCES CITED

The following references are of record in the file of this patent:

UNITED STATES PATENTS

| Number | Name | Date |
| --- | --- | --- |
| 1,936,827 | Campbell | Nov. 28, 1933 |
| 2,024,653 | McCune | Dec. 17, 1935 |
| 2,133,275 | Andres et al. | Oct. 18, 1938 |
| 2,182,047 | Eaton | Dec. 5, 1939 |
| 2,363,664 | Fowler | Nov. 28, 1944 |